(12) United States Patent
Przytulla

(10) Patent No.: US 6,360,907 B1
(45) Date of Patent: Mar. 26, 2002

(54) PALLET CONTAINER

(75) Inventor: Dietmar Przytulla, Kerpen (DE)

(73) Assignee: Mauser Werke GmbH, Brühl (DE)

( * ) Notice: Subject to any disclaimer, the term of this patent is extended or adjusted under 35 U.S.C. 154(b) by 0 days.

(21) Appl. No.: 08/714,889

(22) PCT Filed: Jul. 22, 1994

(86) PCT No.: PCT/EP94/02423

§ 371 Date: Mar. 24, 1995

§ 102(e) Date: Mar. 24, 1995

(87) PCT Pub. No.: WO95/03231

PCT Pub. Date: Feb. 2, 1995

Related U.S. Application Data

(63) Continuation of application No. 08/406,872, filed as application No. PCT/EP94/02423 on Jul. 22, 1994, now abandoned.

(30) Foreign Application Priority Data

Jul. 23, 1993 (DE) ........................................ 93 11 004 U

(51) Int. Cl.$^7$ .............................................. B65D 25/20
(52) U.S. Cl. ................... 220/23.91; 220/669; 220/675; 220/677; 264/536; 264/540; 264/542; 425/532; 425/806
(58) Field of Search ............................... 264/536, 540, 264/542; 425/806 A, 806, 806 R, 532; 220/401, 408, 669, 675, 677, DIG. 12, 23.91

(56) References Cited

U.S. PATENT DOCUMENTS

| | | | | |
|---|---|---|---|---|
| 3,054,150 A | * | 9/1962 | Ditmar .................... | 264/523 X |
| 3,168,207 A | * | 2/1965 | Noland et al. ..... | 264/DIG. 1 X |
| 3,363,282 A | * | 1/1968 | Hagen .................... | 264/536 X |
| 3,390,425 A | * | 7/1968 | Sheptak .................. | 264/523 X |
| 3,724,987 A | * | 4/1973 | Schiemann ............. | 425/532 X |
| 3,783,724 A | * | 1/1974 | Uhlig ..................... | 425/806 A |
| 3,892,828 A | * | 7/1975 | Weatherly et al. ...... | 425/806 X |
| 4,007,242 A | * | 2/1977 | Lorge et al. ............ | 264/536 X |
| 4,176,153 A | * | 11/1979 | Weiler et al. ................ | 264/524 |

(List continued on next page.)

FOREIGN PATENT DOCUMENTS

| | | |
|---|---|---|
| DE | A 1 479 480 | 4/1969 |
| DE | PS 3 819 911 | 7/1992 |
| DE | OS 4 117 159 | 11/1992 |
| EP | A 0 443 500 | 8/1991 |

Primary Examiner—Stephen P. Garbe
Assistant Examiner—N. Eloshway
(74) Attorney, Agent, or Firm—Henry M. Feiereisen

(57) ABSTRACT

The invention refers to a pallet container (10) including a bottom pallet (12), a plastic receptacle (14) arranged thereon and a support jacket (16) closely surrounding the plastic receptacle (14) and fixedly connected (but detachably) on the bottom side with the bottom pallet (12). Conventionally, the thickened pinch-off seam produced in the lower receptacle plate (and also in the upper receptacle plate (22)) through pinching off the tubular parison interferes with a flow of the residual liquid to the bottom-side discharge valve (28). Thus, in accordance with the invention, the inner plastic receptacle (14) is provided with welded pinch-off seams (30) on two diametrically opposing side walls, preferably with one seam ending directly in the integral discharge valve (28). The discharge valve (28) thus lies in the middle of the side walls with the joining weld for the first time entirely in the tube pinch-off area around the blow mandrel within the tube. The thread or the connection flange is formed with an exact calibration on the blow mandrel unit (40) to thereby omit a soldering of the pipe and drilling of the receptacle with all accompanying uncertainties, while improving the residue emptying properties.

14 Claims, 4 Drawing Sheets

U.S. PATENT DOCUMENTS

| | | | | |
|---|---|---|---|---|
| 4,195,053 A | * | 3/1980 | Lambarth | 425/832 X |
| 4,337,025 A | * | 6/1982 | Pagels et al. | 264/523 X |
| 4,382,058 A | * | 5/1983 | Watson et al. | |
| 4,518,558 A | * | 5/1985 | Anway et al. | 425/532 X |
| 4,874,649 A | * | 10/1989 | Daubenbuchel et al. | 264/DIG. 1 X |
| 4,909,387 A | * | 3/1990 | Schutz | 206/386 |
| 4,947,988 A | * | 8/1990 | Schutz | 220/401 X |
| 5,045,255 A | * | 9/1991 | Kurz | 264/536 X |
| 5,106,569 A | | 4/1992 | Rathman et al. | |
| 5,118,460 A | * | 6/1992 | Rydmann | 264/543 X |
| 5,227,114 A | | 7/1993 | Moore | |
| 5,236,656 A | * | 8/1993 | Nakajima | 264/537 X |

\* cited by examiner

PALLET CONTAINER

This is a continuation of application Ser. No. 08/406,872, filed Mar. 24, 1995, now abandoned which is a 371 of PCT/EP94/02423 filed Jul. 22, 1994.

BACKGROUND OF THE INVENTION

The invention refers to a pallet container including a bottom pallet, an inner plastic receptacle placed thereon and a support jacket closely surrounding the inner plastic receptacle and securely fixed (possibly detachably) on its bottom side with the bottom pallet. Further, the invention refers to a particular blow mold and an improved method for making the inner plastic receptacle for this pallet container.

Such pallet containers with a blow molded inner receptacle of thermoplastic material are known for example from DE-OS 41 17 159 or DE-PS 38 19 911.

In a conventional pallet container, the pinch-off seams of the inner plastic receptacle which is placed upon the bottom pallet extend basically in the top plate of the receptacle along via the upper charging opening or laterally next to the charging opening and correspondingly in the bottom plate of the receptacle starting at the discharge pipe which is provided for the discharge valve and laterally arranged on the receptacle bottom. The receptacle wall is slightly thickened along the pinch-off seams through the pinch-off process during closing of the blow mold halves. In general, the plastic receptacle is made in the blow mold in overhead position, i.e. the diametrally greater charging pipe in the center of the receptacle top plate is located at the bottom of the blow mold, with the charging pipe being molded by the blow mandrel and calibrated by the respectively adjoining blow mold halves. The bottom plate of the plastic receptacle is disposed at the top of the blow mold and the bottom-side base area for the pipe of the lateral discharge valve is blown near a side wall to the upper boundary of the blow mold, namely the receptacle bottom plate, in a depression respectively arranged there. A respective bore is later introduced into the base area and the pipe for the discharge valve is welded onto this base area. Because of their thickened material strength, the pinch-off seams created in the receptacle bottom plate as well as receptacle top plate through pinching off the tubular parison have the drawback of cooling off unevenly and slower than the surrounding thinner wall segments. Thus, tensile stress is generated within the pinch-off seams, resulting after ejection of the receptacle from the blow mold in a sagging and sinking of the top plate with the charging pipe and in an upward pulling of the bottom plate with the laterally arranged discharge valve. The sinking of the top plate may be cause for accumulation of rain water in the bung housing around the charging pipe during outdoor storage of the pallet container. Even more disadvantageous is however the sagged and slightly inwardly arched bottom plate which complicates an optimum emptying of residue and a complete drainage of residue liquid from the inner plastic receptacle. Further drawbacks of conventional pallet containers are as follows:

1. In rectangular receptacles, the pinch-off seam in the top plate and bottom plate is about 1,200 mm longer than the height of a side wall of about 1,000 mm.
2. The four side surfaces of the inner plastic receptacle are held by the support jacket while the welded pinch-off seam as critical area of the inner receptacle is exposed;
3. The discharge pipe represents an insert or is subsequently welded on. Also this critical area frequently leads to difficulties through poor welding. The attached discharge pipe represents the most sensitive area in particular during diagonal fall.

SUMMARY OF THE INVENTION

It is an object of the present invention to provide an improved pallet container, obviating the aforestated drawbacks in such a manner that the inner plastic receptacle retains a stable shape, and a sagging of the top plate and inward drawing of the bottom plate during shrinkage is avoided.

In accordance with the invention, this object is attained by extruding during blow molding of the inner plastic receptacle a tubular parison between the open halves of a blow mold comprised of two horizontally traveling mold halves via a blow mandrel which is disposed at the bottom between the opened mold halves, and by injecting the blow air after closing of the blow mold halves via the blow mandrel into the tubular parison until the latter bears upon the inner contour of the blow mold, whereby the discharge pipe for the bottom-side lateral discharge valve of the inner receptacle is formed and calibrated in particular manner on the blow mandrel, and whereby the bung pipe for the diametrally greater charging opening is formed from the mid-area of the tubular parison in a respective depression located in the mid-area of the blow mold, with an external thread being blown at the same time to the bung pipe. During the blow molding process, the charging opening of the bung pipe thus remains closed and is made only after ejection of the plastic receptacle from the blow mold through cutting a plastic disk corresponding to the bunghole out of the upper bung pipe.

Thus, in contrast to conventional manner, the inner plastic receptacle is produced in the blow mold in a position turned by 90°.

The particular blow molding machine for making the inner plastic receptacle for the pallet container according to the invention includes a blow mold comprised of two horizontally traveling mold halves and having a bottom-side blow mandrel and possibly an expanding mandrel such that the pipe of the discharge valve of the inner plastic receptacle can be shaped and calibrated by the blow mandrel with comparably smaller diameter, and that furthermore a round depression is provided at about mid-level centrally and laterally in the blow mold (and at mid-level in each blow mold half) for forming the bung pipe of the initially closed charging opening of the inner plastic receptacle.

The pallet container according to the invention is thus characterized by providing the inner plastic receptacle with the welded pinch-off seams of the tubular parison on two diametrally areas of the vertical side walls, preferably approximately in the wall center. In accordance with the preferred embodiment, one pinch-off seam extends directly above the bottom-side discharge valve vertically in the side wall while the other pinch-off seam is arranged correspondingly vertically in the opposing (rear) side wall. At an internal pressure build up, the shorter welding seams and the protected position of both welding seams in the cover area of the support jacket results in an advantageous behavior of the inner receptacle. The pallet container according to the invention with a particular inner plastic receptacle made in a manner described above eliminates the described drawbacks. The upper receptacle plate remains flat and does neither sag nor is drawn inwards, and in particular, the receptacle bottom plate with slightly funnel-shaped gradient toward the lateral discharge valve remains flat and smooth upon the complementary formed upper surface of the bottom pallet so as to ensure in an optimum manner a complete emptying of residues of the liquid receptacle content.

Since the inner plastic receptacle is turned by 90° to occupy a "transverse position" in the blow mold, or in other words that the tubular parison now "transversely extends" in the inner plastic receptacle of the pallet container, a higher strength of the structural element in direction of the longitudinal axis is achieved. This particular design and the shrinkage-based prestress of the side walls of the inner receptacle with the pinch-off seams oppose the hydrostatic internal pressure of a filled pallet container and the ensuing tendency for buckling.

Since the pipe of the discharge valve is now calibrated exactly reproducible on the blow mandrel, this critical structural element of the plastic receptacle can be shaped with a precise thread or annular flange while the bung pipe of the charging opening with formed outer thread is blown in the blow mold only laterally at about mid-level. This structural element which is countersunk in the receptacle top plate and thus protected is not subjected to particular requirements even when the receptacle is filled even at extreme loads (such as e.g. a receptacle drop).

According to a feature of the blow mold according to the invention, it may be suitable to provide within the lateral round depression a blow needle unit for blowing the bung pipe with charging opening. For example, additional blow air is introduced through this blow needle arrangement into the inner receptacle. In accordance with a particular variation of the method, a coolant like e.g. liquid nitrogen or other undercooled gas can be injected or sprayed after final blowing of the receptacle configuration for obtaining an increased rate of cooling and an earlier ejection of the plastic receptacle from the blow mold.

In accordance with a further variation of the blow mold, the welded plastic surfaces within the pinch-off seam are extended by designing the pinch-off edges complementary to each other in a wavy line or zigzag configuration at the top and bottom in both blow mold halves. The thus generated zigzag pinch-off seam in the side wall of the plastic receptacle has an improved resistance to wear. This variation of the method is in particular suitable for multi-layered coextruded blow molded plastic receptacles.

The embodiment of the pallet container according to the invention and thus of the inner plastic receptacle has the following advantages:

- there is no distortion in the bottom discharge channel, and thus an improved and complete drainage of residue liquid is accomplished,
- the welding seams are shorter, now 1,000 mm instead of previously 1,200 mm,
- the discharge pipe is formed integrally in one piece from the tube, not welded or glued,
- the blow molded article (inner receptacle) is better suitable for blow molding since the height of the pallet container is smaller than its length,
- the welding seams have a better location, they are protected and supported in the support jacket area, and
- overall, the pallet container is more secure through fewer faulty sources.

In accordance with another embodiment, the pinch-off seams of the tubular parison extend in the inner plastic receptacle at two diametrically opposed vertical corner areas of two neighboring side walls. Thus, the welds can be formed in the forward left hand corner area and rear right hand corner area or in the forward right hand corner area and the rear left hand corner area of the side walls of the inner plastic receptacle placed upon the bottom pallet. An arrangement of the welds in the opposing corner area results during a drop test and internal pressure test in slight tensile stress because of the tendency of the inner receptacle to approximate the shape of a sphere, whereby the flat side walls arch outwardly and the corner areas can give way inwardly at angular enlargement.

BRIEF DESCRIPTION OF THE DRAWINGS

The invention will now be explained and described in more detail with reference to an exemplified embodiment schematically illustrated in the drawings in which.

DETAILED DESCRIPTION OF PREFERRED EMBODIMENTS

Figure 1:
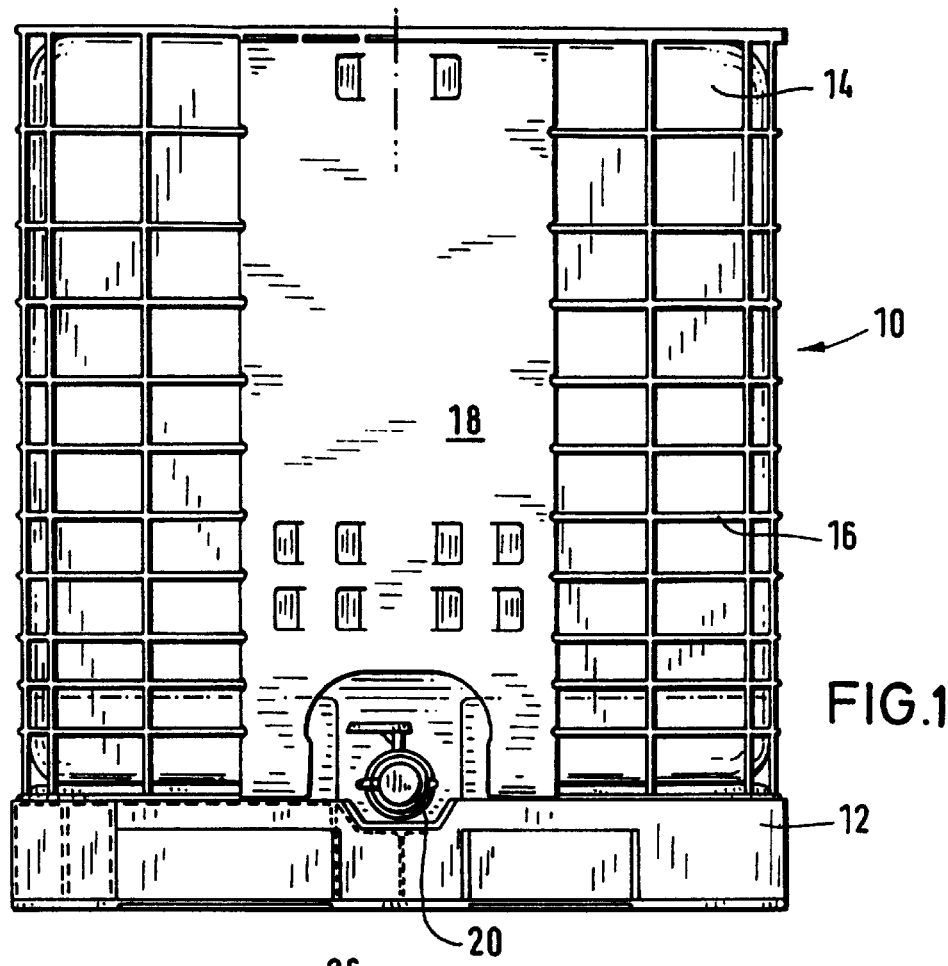
FIG. 1 is a front view of a pallet container according to the invention with discharge valve and clinch sheet.

FIG. 1 shows a pallet container 10 according to the invention with a bottom pallet 12, preferably of recycled regenerated plastic material, a plastic receptacle 14 placed thereon and a support jacket 16 which closely surrounds the plastic receptacle 14 and is securely fixed on its bottom side with the bottom pallet. The support jacket 16 is made preferably of crossing pipe bars or cage bars and is securely fixed but easily detachable with the bottom pallet 12 e.g. through cage bars which are extended to pass through bores in the bottom pallet 12 and screwed from below. The support jacket 16 is provided on its front side with a clinch sheet 18 flanged around the vertical cage bars and has on its bottom side directly above the bottom pallet 12 a lower discharge valve 20 (e.g. 3 inch discharge fitting).

Figure 2:
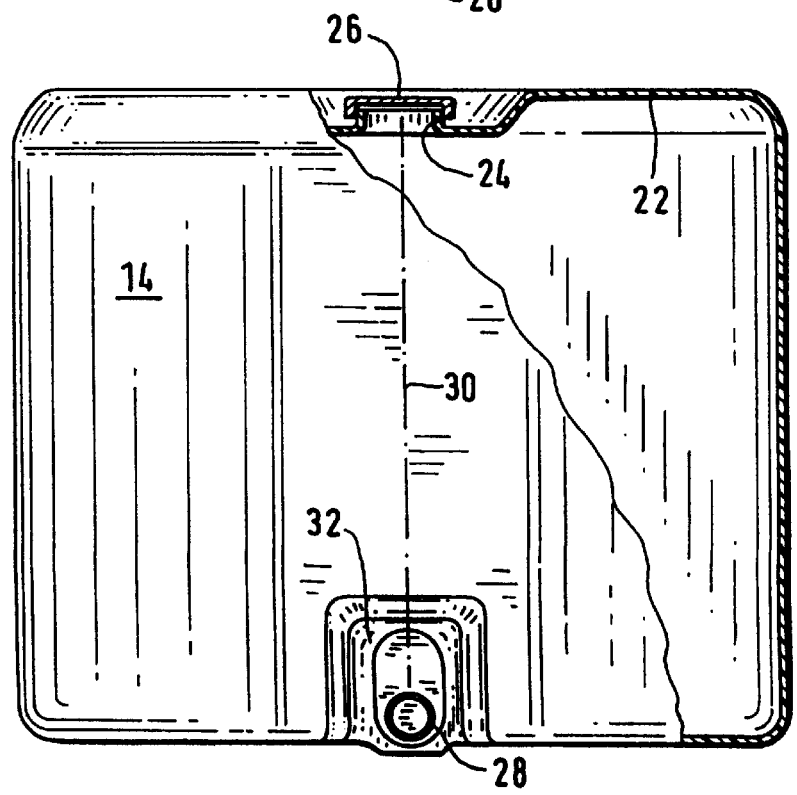
FIG. 2 is also a partially sectional front view of an inner plastic receptacle with discharge valve.

FIG. 2 illustrates the inner plastic receptacle 14 in partially sectional side view, with the upper receptacle plate 22 including at a central location thereof the charging pipe 24 of the charging opening of comparably great diameter (approx. 150 mm diameter) with attached screw cap 26, with the charging pipe 24 being countersunk in a depression which extends across the upper plate 22. Provided at the base of the forward side wall at a level of the lower receptacle plate is the formed discharge pipe 28 (approx. 60 mm diameter) of the discharge valve. The discharge pipe together with the discharge valve are countersunk and thus protected in an inwardly recessed cavity or depression 32 formed in the forward side wall. In particular during diagonal fall, no particular problems are encountered at this otherwise very critical spot.

As indicated by a thicker line (for better recognition), the pinch-off seam 30 of the tubular parison in the forward wall of the plastic receptacle 14 and correspondingly also (however not visible) in the opposing rear wall extends beginning from the discharge pipe 28 vertically upwards. This pinch-off seam 30 may also be of wavy or zigzag configuration.

Figure 3:
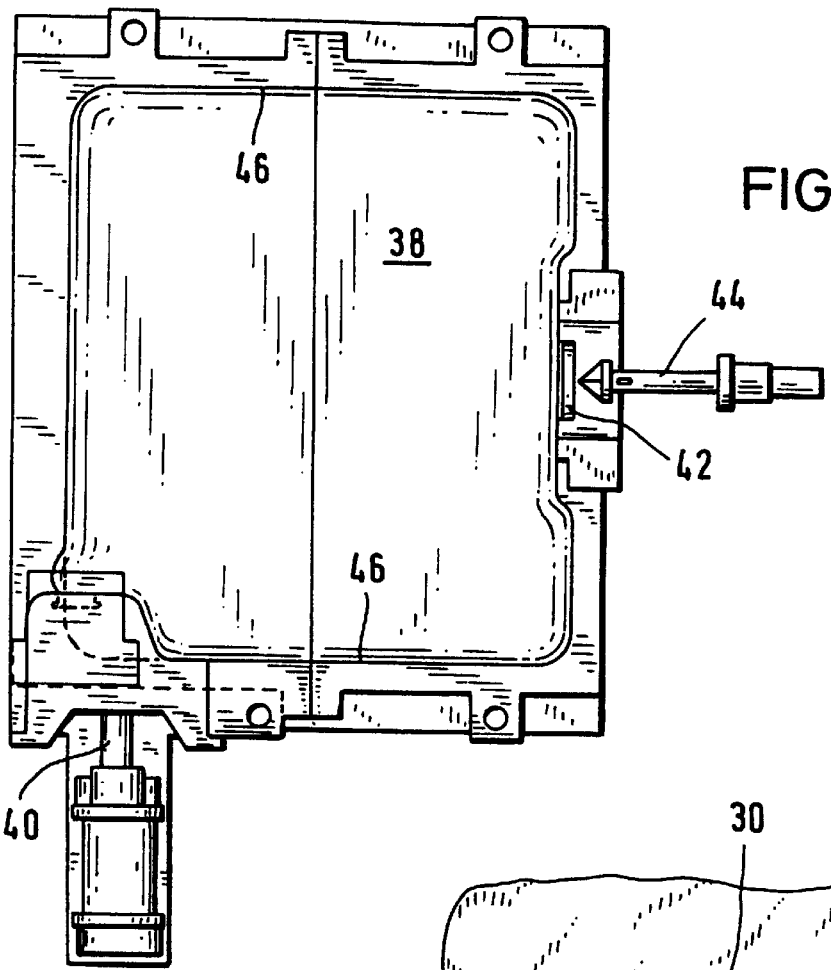
FIG. 3 is a schematic illustration of a blow mold half.

FIG. 3 shows a schematic view of a blow mold half 38, with the pinch-off zone 46 for the tubular parison being located at the top and at the bottom. Arranged on the left hand side of the bottom is the blow mandrel unit 40. The blow mandrel is slidably guided in axial direction and there is no need to unscrew it from the discharge pipe 28 as required e.g. in a bung hole with internal thread, but can simply be pulled out. The blow mold is formed on the right hand side at mid-level of the blow mold half 38 with a round depression 42. Formed in this depression 42 is the threaded pipe 24 with blown external thread for the screw cap 26 of the charging opening. Extending into the depression 42 is a blow needle unit 44, with the radially slidable blow needle being pushed through the tubular parison, and with additional blow air being injected. In contrast to conventional manners of production, the inner receptacle is blown to shape in the blow mold in a position turned by 90°.

Figure 4:
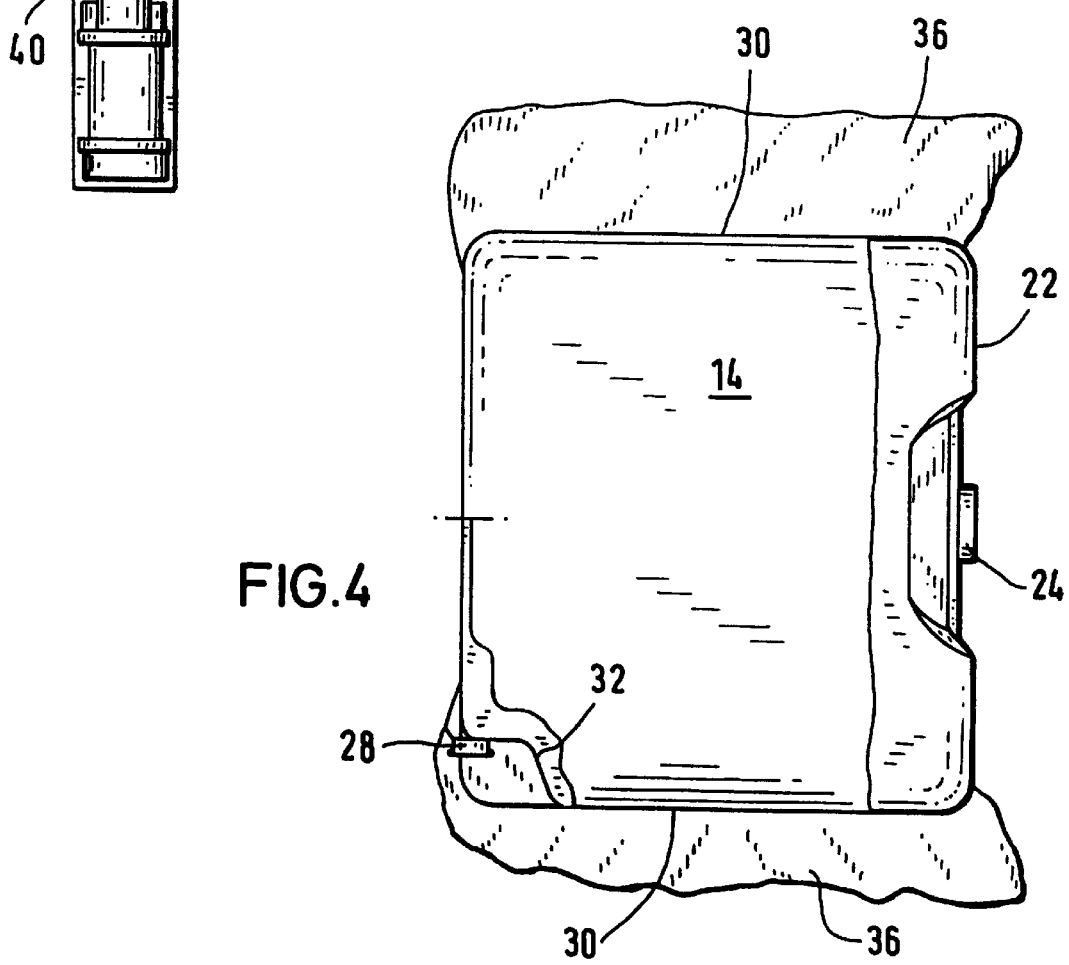
FIG. 4 is an illustration of an inner plastic receptacle with attached flash pieces.

FIG. 4 shows a plastic receptacle 14 just removed from the blow mold, with flash pieces still hanging as residual pieces of the tubular parison therefrom at the top and the bottom and still to be removed.

Figure 5:
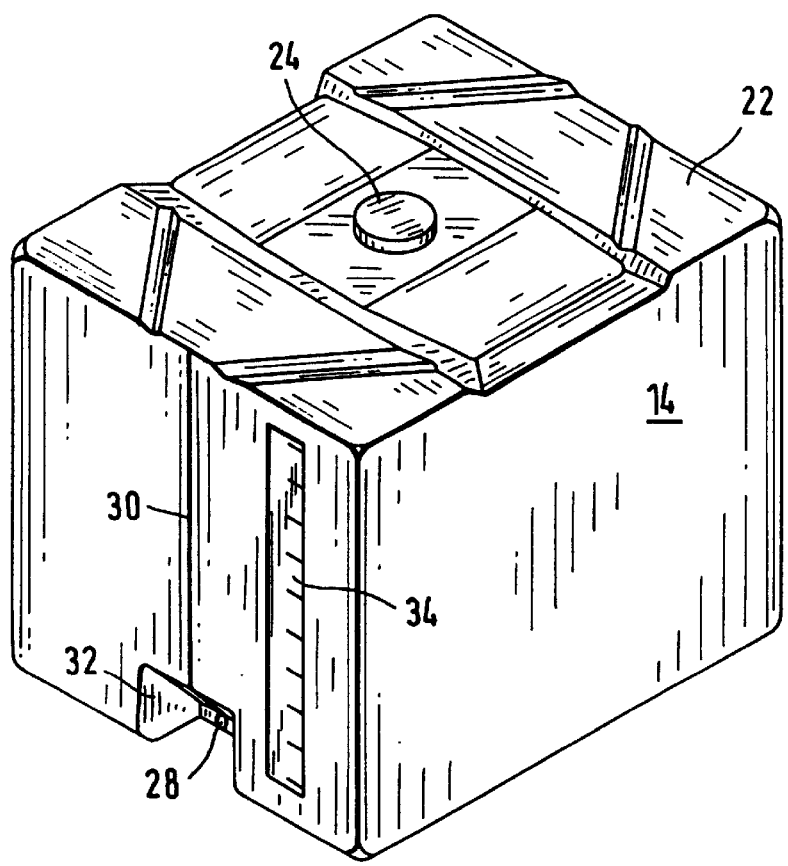
FIG. 5 is a perspective view of an inner plastic receptacle.
Figure 6:
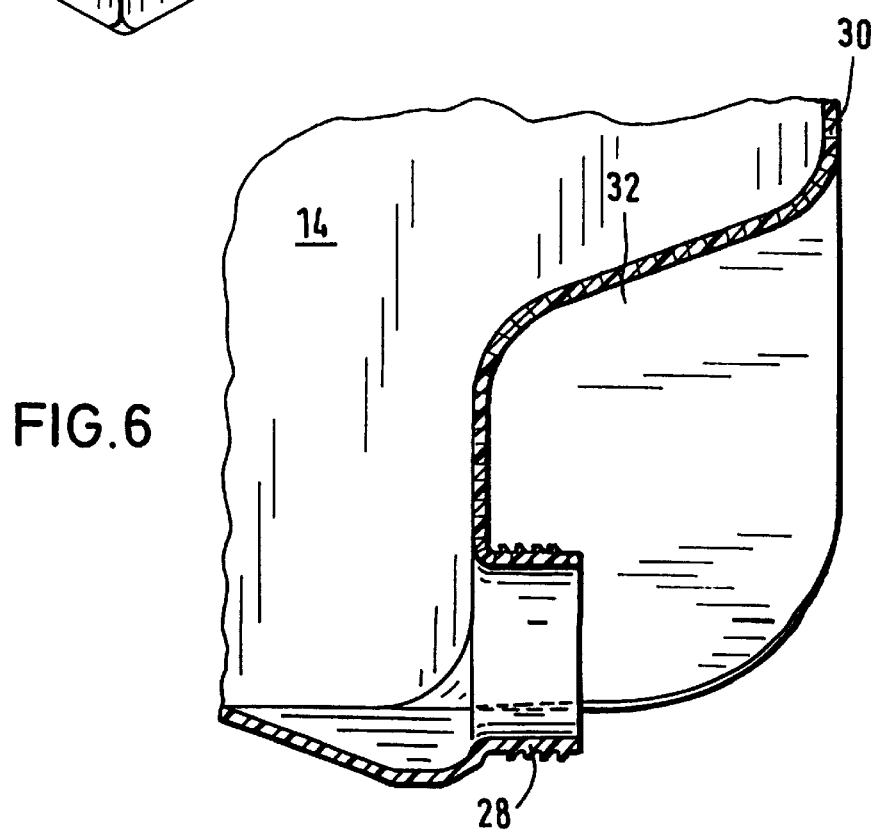
FIG. 6 is a partially sectional view through the area of the discharge pipe of the inner plastic receptacle.
Figure 7:
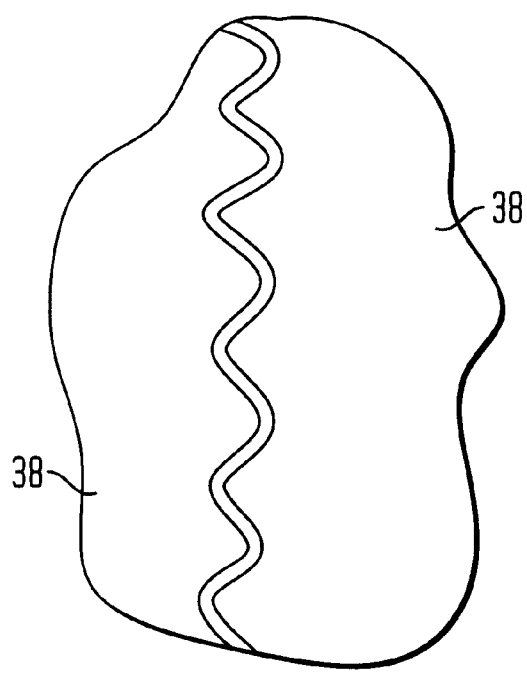
FIG. 7 shows a fragementary, schematic illustration of with pinch-off edges of wavy configuration.
Figure 8:
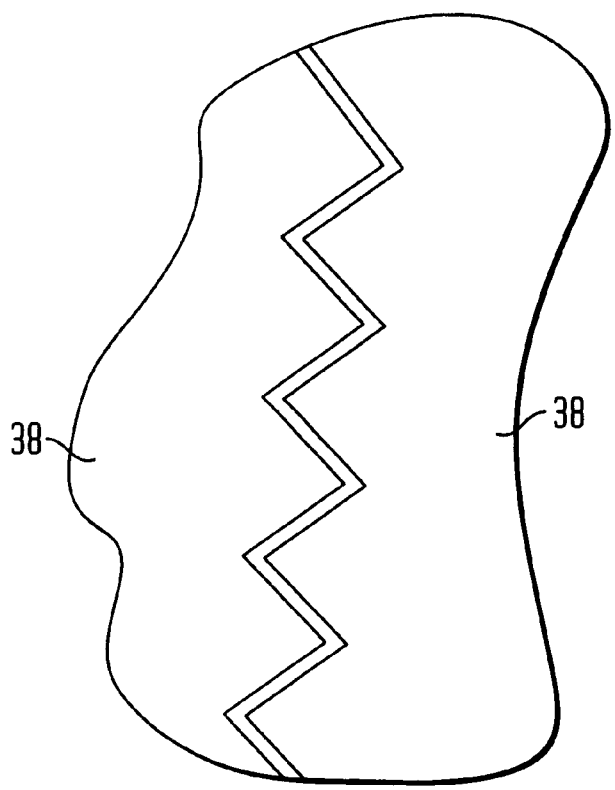
FIG. 8 shows a fragementary, schematic illustration of mold halves with pinch-off edges of zigzag configuration.

FIG. 5 shows a perspective view of the plastic receptacle 14. Formed in the top plate 22 are diagonally extending depressions in which subsequently stiffening bars for the cage support jacket are received. Formed in the forward side wall is further a measuring scale 34 for indicating the filling level of the liquid content. Clearly recognizable (especially indicated by thick line) is also the pinch-off seam 30 in the forward side wall. At the bottom, the pinch-off seam 30 extends into the discharge pipe 28. This is also shown by the partial sectional view of the inner receptacle 14 according to FIG. 6. For better recognition, the pinch-off seam 30 is characterized by a particular hatching.

In the pallet container according to the invention, the discharge pipe 28 of the discharge valve in the middle of the side wall together with the joining weld 30 is now for the first time completely located within the pinch-off area of the tube around the blow mandrel within the tube. The thread or a connection flange is molded with exact calibration on the blow mandrel unit 40 by the blow mold halves 38 to thereby eliminate a welding of the pipe and drilling of the receptacle with all accompanying uncertainties. The threaded pipe or flanged pipe 28 is ready for use during the blow molding procedure and formed as calibrated integral part of the plastic receptacle so as to achieve a significantly improved drop resistance of the pallet container.

Through the features according to the invention, the pallet container has additionally the advantage that the production of the inner plastic receptacle results in an improved quality and is safer. The length of the pinch-off seams is shortened from 1200 mm to 1000 mm by their placement in the side walls while the dimensions of the receptacle remain the same so that also the productivity (output) of the receptacle production is increased by the reduction of the amount of waste.

What is claimed is:

1. A pallet container, comprising:
    a bottom pallet;
    an inner plastic receptacle formed from a tubular parison, placed upon the bottom pallet and having a top plate formed therein with a charging opening, a bottom plate and side walls between the top plate and the bottom plate, said receptacle defining a longitudinal axis oriented in a plane between the top plate and the bottom plate, wherein only a first side wall and a diametrically opposing second side wall of the receptacle exhibit pinch-off seams extending parallel to the longitudinal axis approximately in a central area of the first and second side walls so that the top plate and the bottom plate are devoid of any pinch-off seams; and
    a support jacket closely surrounding the inner plastic receptacle.

2. The pallet container of claim 1 wherein one of the first and second side walls of the receptacle represents a front wall formed with a bottom-near discharge means, with the pinch-off seam in the front wall extending from the discharge means in vertical direction, and with the other one of the first and second side walls representing a rear wall, with the pinch-off seam in the rear wall extending in vertical direction.

3. The pallet container of claim 2 wherein the discharge means includes a discharge pipe formed integrally with the front wall of the receptacle at precise calibration around a blow mandrel at closed blow mold.

4. A blow molding machine for making a plastic receptacle for a pallet container, comprising:
    a blow mold comprised of two mold halves defining a cavity for receiving an elongated tubular parison defining a longitudinal axis and so suspended vertically from an extrusion nozzle as to enter the cavity via a top side of the blow mold, said mold halves traveling in horizontal direction and having a bottom side and side walls extending between the top side and the bottom side, said mold halves exhibiting in one of the side walls at a central area thereof complementary depressions for formation of a round bung pipe for a charging opening of a finished receptacle, with the receptacle occupying a 90° rotated disposition in which the longitudinal axis extends normal to the vertical; and
    a blow mandrel disposed at the bottom side of the blow mold for forming and calibrating a discharge pipe of the finished receptacle.

5. The blow molding machine of claim 4, further comprising a blow needle unit received within the depressions for introducing blow air.

6. The blow molding machine of claim 4 wherein the top side and the bottom side of the mold halves form pinch-off edges of wavy configuration for squeezing off a tubular parison.

7. The blow molding machine of claim 4 wherein the top side and the bottom side of the mold halves form pinch-off edges of zigzag configuration for squeezing off the tubular parison.

8. A method of making a plastic receptacle for a pallet container, comprising the steps of:
    suspending an elongated tubular parison extruded by an extrusion nozzle between opened horizontally traveling mold halves of a blow mold defining a cavity for receiving the parison, with the parison defining a longitudinal axis;
    closing the mold halves: and
    expanding the parison in the cavity of the blow mold by injecting air via a blow mandrel until the parison conforms to an inner contour of the cavity of the blow mold to form a finished plastic receptacle in a 90° rotated disposition in which the longitudinal axis extends normal to the vertical, with a discharge pipe for a bottom-side discharge valve of the receptacle being formed in a pinch-off area and calibrated around the blow mandrel by the closed mold halves, and with a lateral bung pipe for a charging opening being formed laterally in a mid-area of the blow mold.

9. The method of claim 8, and further comprising injecting a coolant via the blow mandrel into the receptacle for accelerating a cooling of the formed receptacle.

10. The method of claim 8 wherein the discharge pipe is molded around the blow mandrel with an exactly calibrated thread by the mold halves.

11. The method of claim 8 wherein the discharge pipe is molded around the blow mandrel with an exactly calibrated connection flange by the mold halves.

12. A plastic receptacle, comprising a top plate formed therein with a charging opening, a bottom plate and side walls extending between the top plate and the bottom plate, said receptacle defining a longitudinal axis oriented in a plane between the top plate and the bottom plate, wherein only a first side wall and a diametrically opposing second side wall of the receptacle exhibit pinch-off seams extending parallel to the longitudinal axis approximately in a central area of the first and second side walls so that the top plate and the bottom plate are devoid of any pinch-off seams.

13. The receptacle of claim 12 wherein one of the first and second side walls of the receptacle represents a front wall formed with a bottom-near discharge means, with the pinch-off seam in the front wall extending from the discharge means in vertical direction, and with the other one of the first and second side walls representing a rear wall, with the pinch-off seam in the rear wall extending in vertical direction.

14. The receptacle of claim 12 wherein the discharge means includes a discharge pipe formed integrally with the front wall of the receptacle at precise calibration around a blow mandrel at closed blow mold.

\* \* \* \* \*